US007788695B2

(12) United States Patent
Walter et al.

(10) Patent No.: US 7,788,695 B2
(45) Date of Patent: Aug. 31, 2010

(54) SYSTEM AND METHOD OF DISTRIBUTING MULTIMEDIA CONTENT

(75) Inventors: Edward Walter, Boerne, TX (US); Thomas H. Adams, San Antonio, TX (US); Michael Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 306 days.

(21) Appl. No.: 11/510,519

(22) Filed: Aug. 25, 2006

(65) Prior Publication Data

US 2008/0066126 A1    Mar. 13, 2008

(51) Int. Cl.
*H04N 7/173* (2006.01)
*G06F 3/00* (2006.01)
*G06F 13/00* (2006.01)
*H04N 5/445* (2006.01)
*H04N 7/18* (2006.01)

(52) U.S. Cl. .............................. 725/97; 725/43; 725/44; 725/74

(58) Field of Classification Search .................. 725/97, 725/43
See application file for complete search history.

(56) References Cited

U.S. PATENT DOCUMENTS

| 6,530,082 | B1 | 3/2003 | Del Sesto et al. |
| 6,836,799 | B1 | 12/2004 | Philyaw et al. |
| 7,006,613 | B2 * | 2/2006 | Novak et al. ............ 379/142.01 |
| 7,055,166 | B1 | 5/2006 | Logan et al. |
| 7,079,176 | B1 | 7/2006 | Freeman et al. |
| 7,221,387 | B2 * | 5/2007 | Fernandez et al. ........ 348/14.08 |
| 7,266,836 | B2 * | 9/2007 | Anttila et al. ................ 725/133 |
| 2003/0066074 | A1 | 4/2003 | Zimmerman et al. |
| 2004/0148353 | A1 | 7/2004 | Karaoguz et al. |
| 2004/0231003 | A1 * | 11/2004 | Cooper et al. ................ 725/135 |
| 2005/0055713 | A1 * | 3/2005 | Lee et al. ....................... 725/46 |
| 2005/0141542 | A1 * | 6/2005 | Handekyn et al. ............ 370/437 |
| 2005/0262542 | A1 * | 11/2005 | DeWeese et al. ............ 725/106 |
| 2006/0282851 | A1 * | 12/2006 | Errico et al. ................... 725/39 |
| 2007/0050822 | A1 * | 3/2007 | Stevens et al. ................ 725/74 |
| 2007/0157281 | A1 * | 7/2007 | Ellis et al. .................... 725/134 |
| 2007/0204287 | A1 * | 8/2007 | Conradt et al. ................ 725/28 |

FOREIGN PATENT DOCUMENTS

WO        01/50309 A2    7/2001

OTHER PUBLICATIONS

International Search Report and Written Opinion of the International Searching Authority for International Application No. PCT/US2007/015862, mailed Jun. 3, 2008.

* cited by examiner

*Primary Examiner*—John W Miller
*Assistant Examiner*—Chris Parry
(74) *Attorney, Agent, or Firm*—Toler Law Group (57) ABSTRACT

The present disclosure is directed to a system and method for enhanced multimedia distribution. The method can include displaying a multimedia selection at a display device coupled to a first receiver of a video distribution system, where the multimedia selection is determined by a user of a second receiver. A multimedia device can include a user interface module to receive a command from a first user to accept a channel selection of a second user. An indication of an attribute of multimedia content associated with a channel selected at a multimedia device can be received from a server having a channel content guide and stored to a database.

10 Claims, 7 Drawing Sheets

SYSTEM AND METHOD OF DISTRIBUTING MULTIMEDIA CONTENT

FIELD OF THE DISCLOSURE

The present disclosure relates generally to distributing multimedia content.

BACKGROUND

Many people enjoy being able to interact with others while participating in tasks. Some websites offer features that allow users to receive a notification when other members a particular group are logged into the website. Text messaging applications allow users to interact with each other in real-time while performing other tasks at a computer. However, such applications are often tailored to support an underlying product or service and therefore may only appeal to, or be available to, a limited audience. Furthermore, using these applications requires users to be present at a networked computer instead of engaging in other available entertainment activities. Hence, there is a need for an improved system and method of distributing multimedia content.

DETAILED DESCRIPTION OF THE DRAWINGS

In an embodiment, a multimedia device is disclosed. The device includes a memory device accessible to a processor. The device also includes a user identification module to identify a first user of the multimedia device. The device further includes a user interface module to receive a command from the first user to accept a channel selection of a second user, where the channel selection is received via the network interface.

In another embodiment, a method of distributing multimedia content is disclosed. The method includes displaying a multimedia selection at a display device coupled to a first receiver of a video distribution system. The multimedia selection is determined by a user of a second receiver of the video distribution system.

In another embodiment, a method of distributing multimedia content is disclosed. The method includes providing a multimedia selection to a first multimedia device of a first user. The multimedia selection is determined by a second user at a second multimedia device.

In another embodiment, a distributing multimedia content is disclosed. The method includes receiving first data at a server of a television system, where the first data identifies a first television channel selected at a first multimedia device. The method also includes determining first multimedia content associated with the first data and receiving second data indicating a first attribute of the first multimedia content from a server having a channel content guide. The method further includes storing an indication of the first attribute and an indication of the first multimedia content to a database.

In another embodiment, a graphical user interface is disclosed. The interface includes a first viewing region to display first video content received at a first multimedia device from a multimedia distribution system. The interface also includes a second viewing region to display second video content received from the multimedia distribution system, where the second video content is determined by a user of a second multimedia device coupled to the multimedia distribution system. The interface further includes an indication of a channel selected by a user of a third multimedia device coupled to the multimedia distribution system.

In another embodiment, a processor readable medium embodying executable instructions is disclosed. The executable instructions include instructions to receive a data stream from a television system via a network interface and instructions to send a video signal included in the data stream to display at a display device. The executable instructions also include instructions to send a first selectable menu to display at the display device when a first menu tag is identified in the data stream, and instructions to send a first signal to a server of the television system that stores viewer feedback. The first signal indicates a selected option of the first selectable menu. The executable instructions further include instructions to send a second selectable menu to display at the display device when a second menu tag is identified in the data stream and instructions to send a second signal to a server of the television system that identifies a channel selection of members of a group. The second signal indicates a selected option of the second selectable menu.

Figure 1:
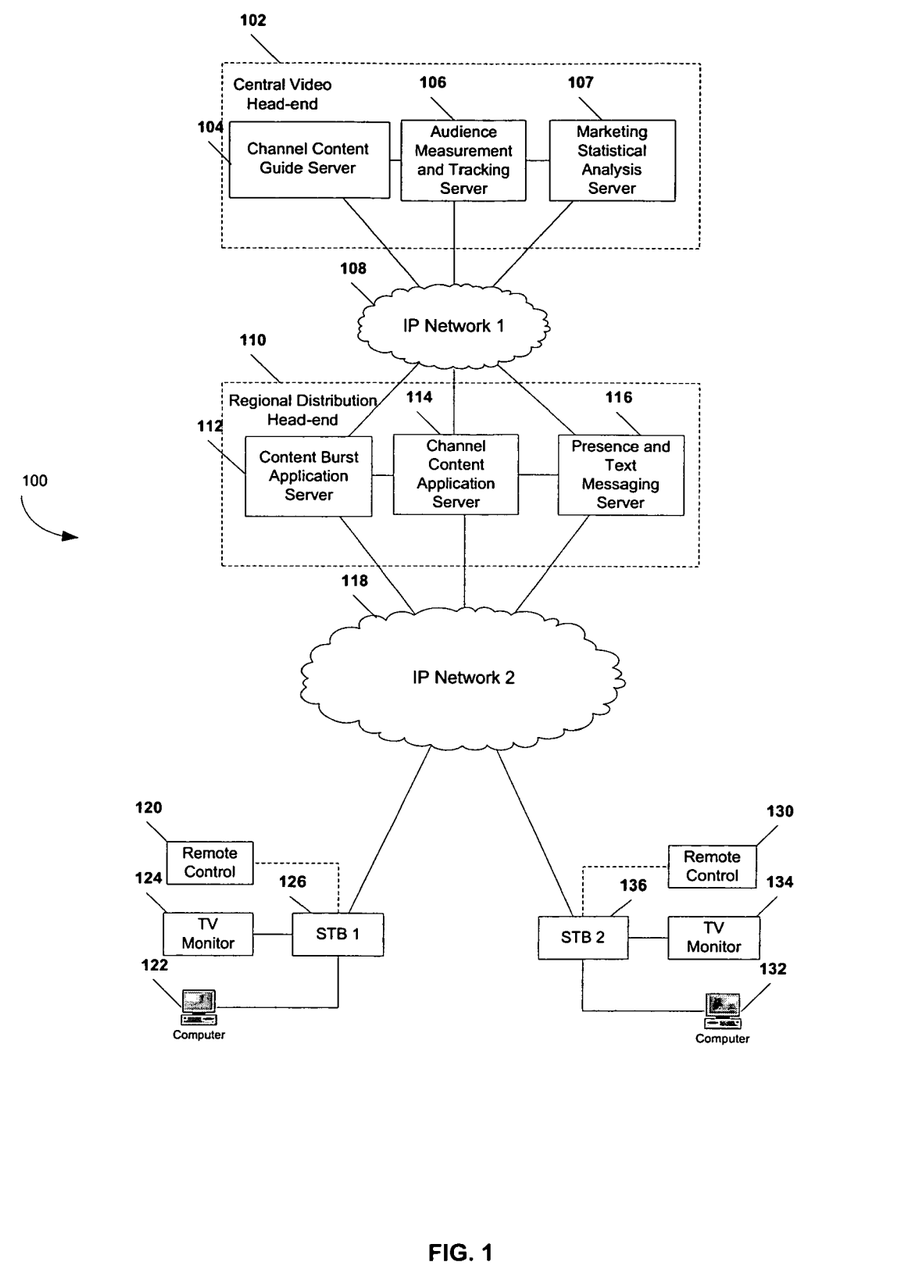
FIG. 1 is a block diagram of a particular illustrative embodiment of a system to distribute multimedia content.

Referring to FIG. 1, a block diagram of a particular illustrative embodiment of a system to distribute multimedia content is depicted and generally designated 100. In an illustrative embodiment, the system 100 can be an Internet Protocol television (IPTV) system, or can include portions thereof. The system 100 includes a central video head-end 102 that includes a channel content guide server 104; an audience measurement and tracking (AMT) server 106; and a marketing statistical analysis server 107. The central video head-end 102 communicates with a regional video distribution head-end 110 via a first internet protocol (IP) network 108, which may be a private IP network, a public IP network, such as the Internet, or any combination thereof. The regional video distribution head-end includes a channel content burst application server 112, a channel content application server 114, and a presence and text messaging server 116.

A first set-top box (STB) 126 communicates with the regional video distribution head-end 110 via a second IP network 118. In an illustrative embodiment, the first STB 126 can be coupled to a display device, such as a first television monitor 124. Further, the first STB 126 can communicate with a first remote control device 120. In a particular embodiment, the first STB 126 can be coupled to a first user computer 122. A second set-top box (STB) 136 communicates with the regional video distribution head-end 110 via the second IP network 118. In an illustrative embodiment, the second STB 136 can be coupled to a display device, such as a second television monitor 134. Further, the second STB 136 can communicate with a second remote control device 130. In a particular embodiment, the second STB 136 can be coupled to a second user computer 132.

In a particular embodiment, the channel content guide server 104 can store or access channel content, including programming titles, program descriptions, other data indicating at least one attribute of at least some of the programming offered by the IPTV system 100, or any combination thereof. In a particular embodiment, the AMT server 106 can receive data indicating viewing activities of subscribers to the system 100, as well as categorize, supplement, aggregate, and store the data in a viewing history database. In a particular embodiment, the marketing statistical analysis server 107 can request and receive viewing data from the AMT server 106, perform statistical or other analysis on the data, and publish the data either as raw data or reports, in real-time or offline, via dedicated clients, or website access, or the like, or any combination thereof.

The presence and text messaging server 116 maintains data identifying members of one or more presence groups and data corresponding to interactions of group members with the IPTV system 100. Members of a presence group can detect and interact with other members of the group, such as a group of subscribers of the IPTV system 100. In a particular embodiment, the presence and text messaging server 116 can communicate with consumer multimedia devices, such as STBs 126, 136. The presence and text messaging server 116 can receive data from STBs 126, 136 indicating login and logout information, text messaging information, multimedia content selection information, menu option selection information, or any other data sent by the STBs 126, 136, or any combination thereof. The presence and text messaging server 116 can also send data to STBs 126, 136, such as text messaging data, presence group member identification and current content selection data, notification and menu option data to display to users, any other data, or any combination thereof. In a particular embodiment, the presence and text messaging server 116 can send data to the AMT server 106, such as group data, member login data, member content selection data, temporary and permanent channel link data, or other data related to tracking group members' viewing history, or any combination thereof.

In a particular illustrative embodiment, the presence and text messaging server 116 can also communicate with the channel burst application server 112 and the channel content application server 114. In a particular illustrative embodiment, when a member of a presence group elects to receive multimedia content selected by another member of the group, such as in response to an invitation or via a temporary channel link or a permanent channel link, the presence and text messaging server can send data indicating the new channel selection to the content burst application server 112 and the channel content application server 114. The content burst application server 112 and the channel content application server 114 can send multimedia content to a set-top box of the group member corresponding to the new channel selection.

In a particular illustrative embodiment, a first user of the first STB 126 can establish a session with the IPTV system 100, such as by turning on the STB 126, turning on the television 124, interacting with the remote control device 120, or any combination thereof. In a particular embodiment, establishing the session can include a first user authenticating to the system 100 via the STB 126 by entering identifying information, such as a password, a user identification number, a biometric signal, other identifying information, or any combination thereof.

In a particular illustrative embodiment, the first STB 126 sends information identifying the first user to the presence and text messaging server 116 via the second IP network 118, which can be a private network, a public network, such as the Internet, or any combination thereof. After receiving the identifying information from the first STB 126, the presence and text messaging server 116 can authenticate the first user and generate and store data corresponding to the current session of the first user with the system 100.

In a particular illustrative embodiment, the first user can be associated with a first presence group at the presence and text messaging server 116. After receiving data identifying the first user, the presence and text messaging server 116 can identify the first user as a member of the first presence group. The presence and text messaging server 116 can also identify other members of the first presence group that have been identified as participating in a session with the system 100. In a particular illustrative embodiment, each user authorized to participate in a presence group can perform a login process to establish a session with the presence and text messaging server 116. The presence and text messaging server 116 can identify all members of the first group that have established a session, and provide information to each of the identified members corresponding to session activity of each of the other members.

In a particular illustrative embodiment, the presence and text messaging server can provide data to the first user via the second IP network 118 and the first STB 126 identifying other members of the first group that have established a session and which programs or television channels the other members have selected. In a particular illustrative embodiment, the presence and text messaging server 118 can also establish a text message session allowing the members of the first group to communicate via text messaging.

Figure 6:
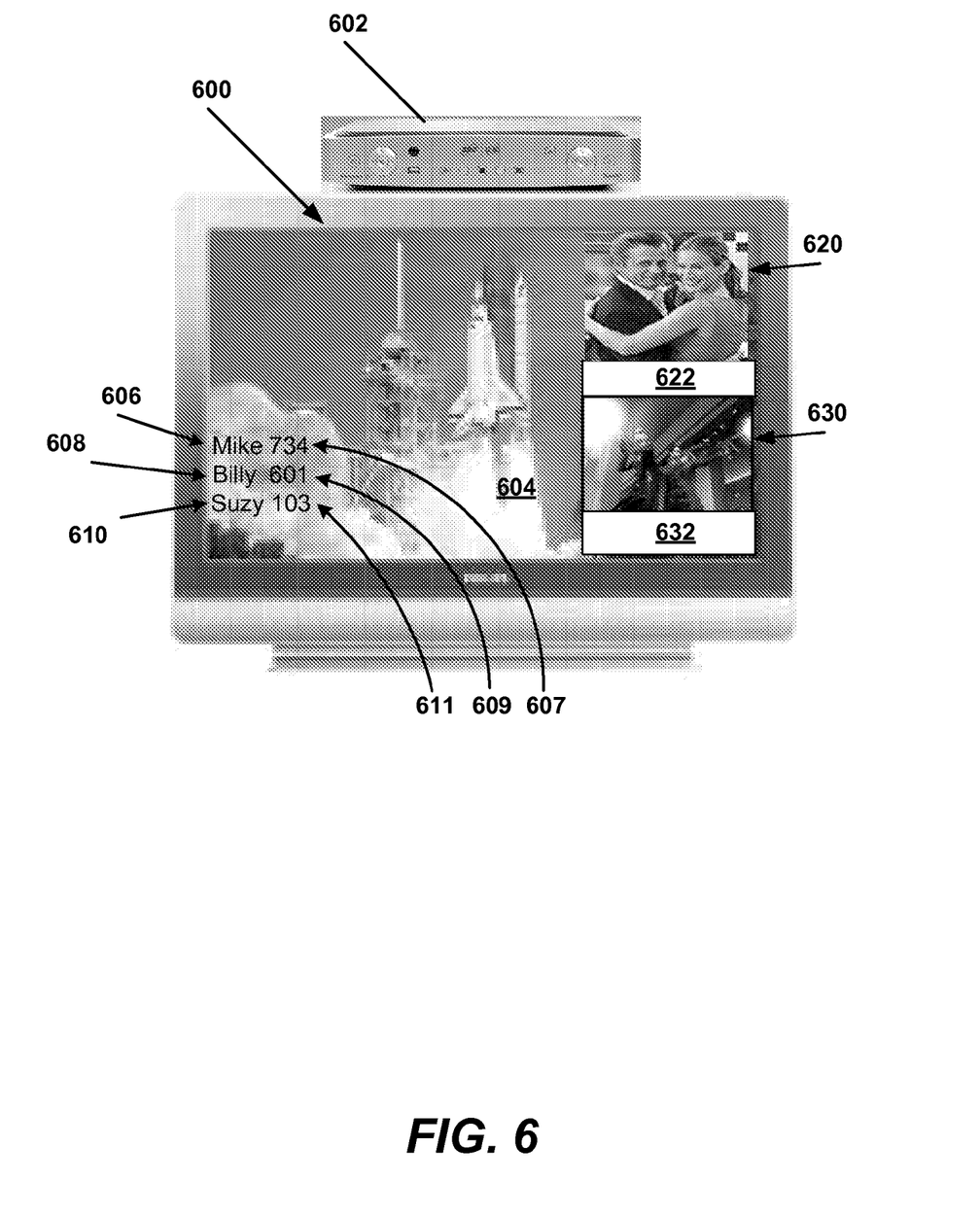
FIG. 6 is a diagram of a particular illustrative embodiment of a graphical user interface to distribute multimedia content.

In another particular illustrative embodiment, the presence and text messaging server 116 can send a signal to one or more members of a group, such as the first user of the first STB 126, indicating that another member of the group has selected content from the system 100. In a particular illustrative embodiment, the first STB 126 can send the indication to the television monitor 124. the indication can include a notice of the selection of content and one or more selectable options. The notice and selectable options may overlay multimedia content displayed on the group member's display device. An example of such an indication is illustrated in FIG. 6.

In an illustrative embodiment, the first user of the first STB 126 and a second user of the second STB 136 can belong to the same presence group. When the second user establishes a session, the first user can be provided a notice at the first television monitor 124 that the second user is logged on to the system 100. The first user can also be provided an indication of a channel currently selected by the second user. A menu of selectable options can be displayed at the television monitor 124 that can include options to display a text messaging interface, to invite the second user to view the same content as the first user, to view the content selected by the second user, to establish a permanent channel link with the second user, or any combination thereof. In an illustrative embodiment, the presence and text messaging server 116 can send data related to the menu to the STB 126 to display on the television monitor 124. In another illustrative embodiment, data related to the menu is retrieved from a memory device of the STB 126.

In a particular embodiment, the presence and text messaging server 116 can also create and maintain data identifying permanent channel links between members of presence groups. A permanent channel link can be established between two or more members of a group when a participating member elects to allow multimedia content displayed at his or her display device to be determined by any other participating member. In a particular illustrative embodiment, the first user of the first STB 126 and the second user of the second STB 136 may join a permanent channel link with other members of the first presence group. The content presently selected on the permanent channel link is provided to both the first user and the second user. Any member participating in the permanent channel link may change the selected content, and the new selection can be automatically provided to all participating members without prompting the members to approve the change. The permanent channel link can be maintained for each group member until the member indicates otherwise. For example, the first user can end a permanent channel link by turning off the display device 124 or the STB 126, by logging out of the presence group session, by selecting a menu option to exit the permanent channel link, or any combination thereof.

Although in the particular illustrative embodiment depicted in FIG. 1, the content and channel guide server 104, the AMT 106, and the marketing statistical analysis server 107 are located at the central video head-end 102, while the content burst application server 112, the channel content application server 114, and the presence and text messaging server 116 are located at the regional video distribution head-end, it should be understood that any or all of the servers 104, 106, 107, 112, 114 and 116 may instead be located at other locations throughout the system 100. Furthermore, it should be understood that multiple servers 104, 106, 107, 112, 114, 116 may reside on a single physical server device, or that one or more servers 104, 106, 107, 112, 114, 116 may be embodied in multiple physical server devices.

Figure 2:
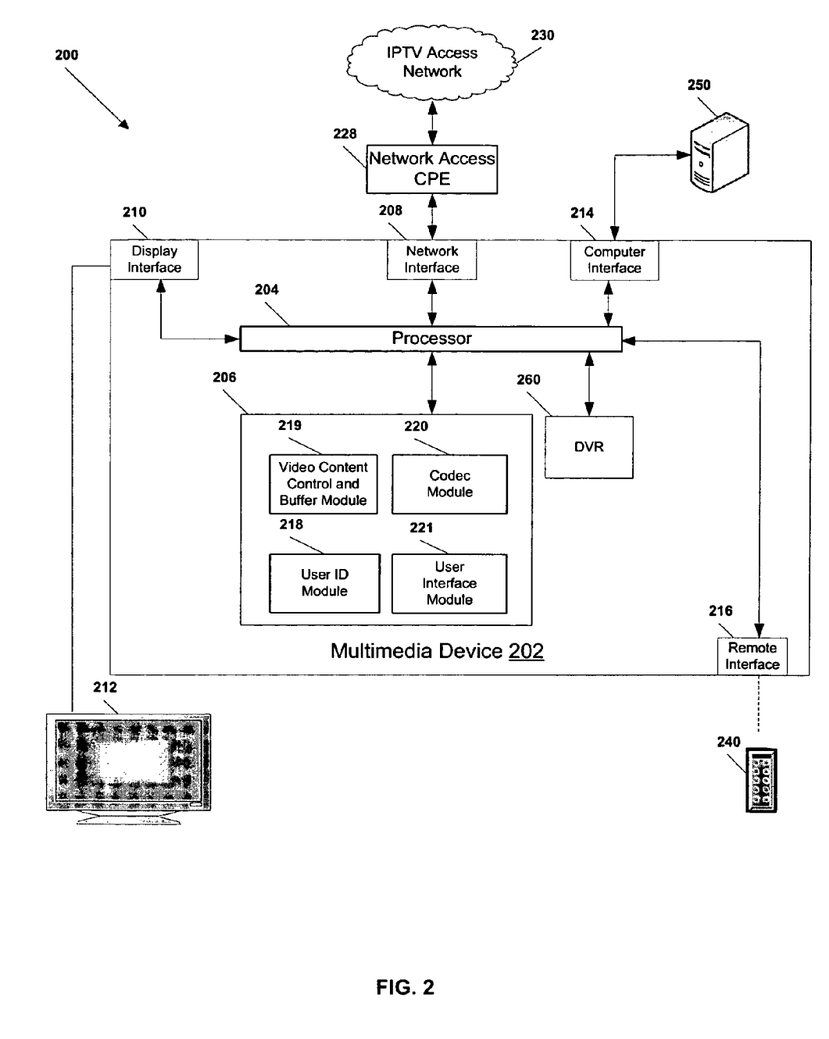
FIG. 2 is a block diagram of a second particular illustrative embodiment of a system to distribute multimedia content.

Referring to FIG. 2, a block diagram of a second particular illustrative embodiment of a system to distribute multimedia content is depicted and generally designated 200. The system 200 includes a multimedia device 202, such as a set-top box, communicating with an IPTV access network 230 via network access customer premises equipment (CPE) 228 coupled to a network interface 208 of the multimedia device 202. The multimedia device 202 can include a display interface 210 to communicate with a display device, such as a television monitor 212. The multimedia device 202 can also include a remote control interface 216 to communicate with a remote control device 240 and a computer interface 214 to communicate with a user computer 250. The multimedia device 202 includes a processor 204 and memory device 206 accessible to the processor 204. In an illustrative embodiment, the multimedia device 202 can also include a digital video recorder (DVR) coupled to the processor 204.

The memory device 206 can include a video content control and buffer module 219 to receive multimedia content from a first source via the network interface. In a particular illustrative embodiment, the first source can be a server of an IPTV system, such as the channel burst application server 112 or the channel content application server 114 of the IPTV system 100 depicted in FIG. 1. The memory device 206 can also include a coder-decoder (CODEC) module to process multimedia content.

In a particular embodiment, the memory device 206 can include a user identification (ID) module 218. The user ID module 218 can identify a first user of the multimedia device 202 after receiving identification information from the first user such as a name, account number, identification code, password, biometric signature, any other identification information, or any combination thereof. In a particular illustrative embodiment, the user ID module 218 can authenticate the first user by comparing the identification information to data stored in the memory device 206. In a particular illustrative embodiment, the user ID module can authenticate the first user by sending identification data to an authentication source via the network interface 208, such as the presence and text messaging server 116 of the system 100 depicted in FIG. 1.

In a particular embodiment, the multimedia device 202 can include a user interface module 221 to receive a command from the first user to accept a channel selection of a second user, where the channel selection is received via the network interface 208. In a particular illustrative embodiment, a signal can be received via the network interface 208, such as from the presence and text messaging server 116 of the IPTV system 100 depicted in FIG. 1, indicating that the second user has selected a particular channel of an IPTV system. The user interface module 221 can display a notification of the channel selection of the second user at the display device 212 that overlays multimedia content. An illustrative embodiment of a graphical user interface displaying channel selections of one or more other users is depicted in FIG. 6.

In a particular illustrative embodiment, the user interface module 221 can be executable by the processor 204 to display a selectable menu concurrently with the notification. The selectable menu can include a first option to display content associated with the channel selection. For example, upon receiving a signal indicating a channel selection by the second user, the user interface module 221 can send a selectable menu to the display device 212 identifying the second user, the new channel selection of the second user, and options to accept the channel change or to reject the channel change. A selection of the menu options can be performed by navigation and selection keys of the remote control device 240, or by a keyboard or pointing device of the computer 250, or by other mechanisms, such as a speech recognition interface (not shown), or any combination thereof.

In an illustrative embodiment, the multimedia device 202 can display multimedia content associated with the channel selected by the second user in response to receiving a selection by the first user to accept the channel change. In an illustrative embodiment, the user interface module 221 can send a prompt to the display device 212 to determine if multimedia content associated with the new channel or a prior channel should be displayed as a picture-in-picture display. In another illustrative embodiment, multimedia device 202 can automatically display content associated with a presence group as a picture-in-picture display.

In a particular illustrative embodiment, the user interface module 221 can send to the display device 212 a selectable menu that includes a second option to display content associated with all channel selections provided by members of a predefined group that includes the first user and the second user. The second option can be offered in the same selectable menu as the first option, or can be offered after the first user has selected to accept the channel selection of the second user. In a particular illustrative embodiment, the predefined group may be a presence group maintained by the presence and text messaging server 116 of the IPTV system 100 depicted in FIG. 1. In another particular illustrative embodiment, the predefined group can instead be maintained at the multimedia device 202, at a computer in communication with the multimedia device 202 via the computer interface 214, such as computer 250 or another computer (not shown) in communication with computer 250, or any combination thereof.

In a particular embodiment, the user interface module 221 can be executable by the processor 204 to resolve ambiguous commands received from the user. For example, a channel change signal received via the remote interface 216 may either indicate a channel change for the user only, or a channel change to be broadcast to one or all presence groups of the user. The user interface module 221 may send a menu to the display device 212 with selectable options to interpret the channel change command.

In a particular embodiment, the user interface module 221 can send a selectable menu to display at the display device 212 when a menu tag is identified in a data stream received from an IPTV system via the IPTV access network interface 230. For example, the data stream can include a video signal to display at the display device. The data stream may further include one or more menu tags containing data related to a menu to be displayed at the display device 212. In an illustrative embodiment, a menu tag can provide data defining a menu size, shape, menu text or selectable option text, time of display, latest time to display, or method of display of the menu, executable instructions to be processed by the processor 204 when a particular option is selected, a network address to send a response made by the user, other data associated with a selectable menu, or any combination thereof. In another illustrative embodiment, one or more predetermined selectable menus can be stored at the multimedia device 202 so that the menu tag can reference a predetermined menu to display. In another illustrative embodiment, menu components can be stored at the multimedia device 202, and the menu tag can instruct the processor 204 to assemble a menu from specified components, for instance, via the user interface module 221.

In a particular embodiment, the multimedia device 202 can send a first menu to the display device 212 when a first menu tag is identified in the data stream received from the IPTV system. The multimedia device 202 can send a first signal or data to a server of the television system that stores viewer feedback, where the first signal or data indicates a selected option of the first selectable menu. In an illustrative embodiment where the multimedia device 202 is coupled to the IPTV system 100 as depicted in FIG. 1, the first menu tag may be a request for real-time user feedback to a television program, such as a live broadcast of a presidential speech, and the user feedback can be sent to the AMT 106.

In a particular embodiment, the multimedia device 202 can send a second selectable menu to the display device 212 when a second menu tag is identified in the data stream. A second signal or data indicating a selected option of the second selectable menu can be sent by the multimedia device 202 to a server of the television system that identifies a channel selection of one or more members of a group. In an illustrative embodiment where the multimedia device 202 is coupled to the IPTV system 100 as depicted in FIG. 1, the multimedia device 202 can send the second signal to the presence and text messaging server 116.

Figure 3:
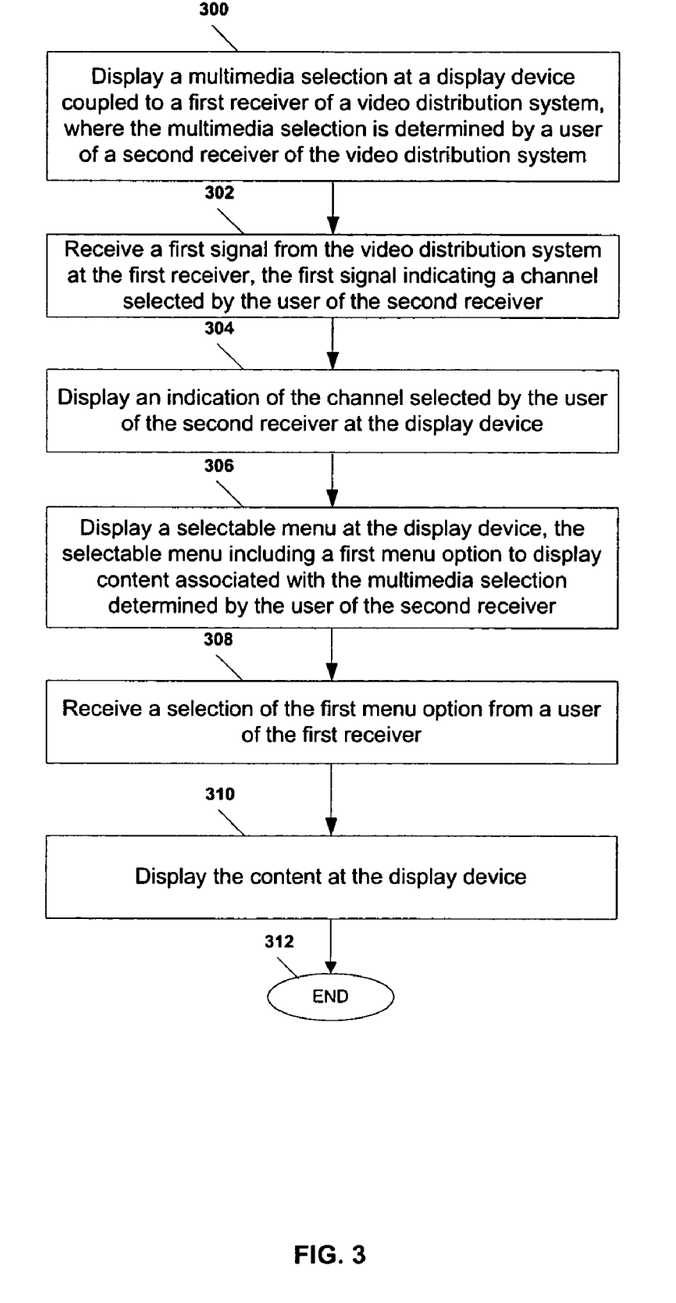
FIG. 3 is a flow diagram of a particular illustrative embodiment of a method of distributing multimedia content.

Referring to FIG. 3, a flow diagram of a particular illustrative embodiment of a method of distributing multimedia content is depicted. At block 300, a multimedia selection is displayed at a display device coupled to a first receiver of a video distribution system, wherein the multimedia selection is determined by a user of a second receiver of the video distribution system. In an illustrative embodiment, an indication of the multimedia selection is provided at the display device. In another illustrative embodiment, content of the multimedia selection is displayed.

In a particular illustrative embodiment, the video distribution system can be a television system, such as an IPTV system, and the first and second receivers can be set-top boxes such as the STBs 126, 136 as depicted in FIG. 1. In a particular embodiment, a first user of the first receiver and a second user of the second receiver are both members of a group, such as a presence group of the video distribution system. In a particular embodiment, a server of the video distribution system stores data that identifies members of the group. For example, the video distribution system can be an IPTV system such as the system 100 depicted in FIG. 1, and the server that stores data identifying members of the group can be the presence and text messaging server 116.

Moving to block 302, in a particular embodiment, a first signal is received from the video distribution system at the first receiver. The first signal indicates a channel selected by the user of the second receiver. Proceeding to block 304, in a particular embodiment, an indication of the channel selected by the user of the second receiver is displayed at the display device coupled to the first receiver.

Continuing to block 306, in a particular embodiment, a selectable menu is displayed at the display device coupled to the first receiver, the selectable menu including a first menu option to display content associated with the multimedia selection determined by the user of the second receiver. Moving to block 308, in a particular embodiment, a selection of the first menu option is received from a user of the first receiver.

Proceeding to block 310, the content is displayed at the display device. In a particular illustrative embodiment, the first receiver may tune to a channel associated with the multimedia selection. In another particular illustrative embodiment, the first receiver may send a request for the content to one or more content sources of the multimedia distribution system. In another particular illustrative embodiment, a server of the multimedia distribution system, such as the presence and text messaging server 116 of the IPTV system 100 depicted in FIG. 1, may receive a signal indicating the selection of the first menu option, and may instruct content servers such as the content burst application server 112 or the channel content application server 114, or any combination thereof, to send the content to the first receiver. The method terminates at block 312.

Figure 4:
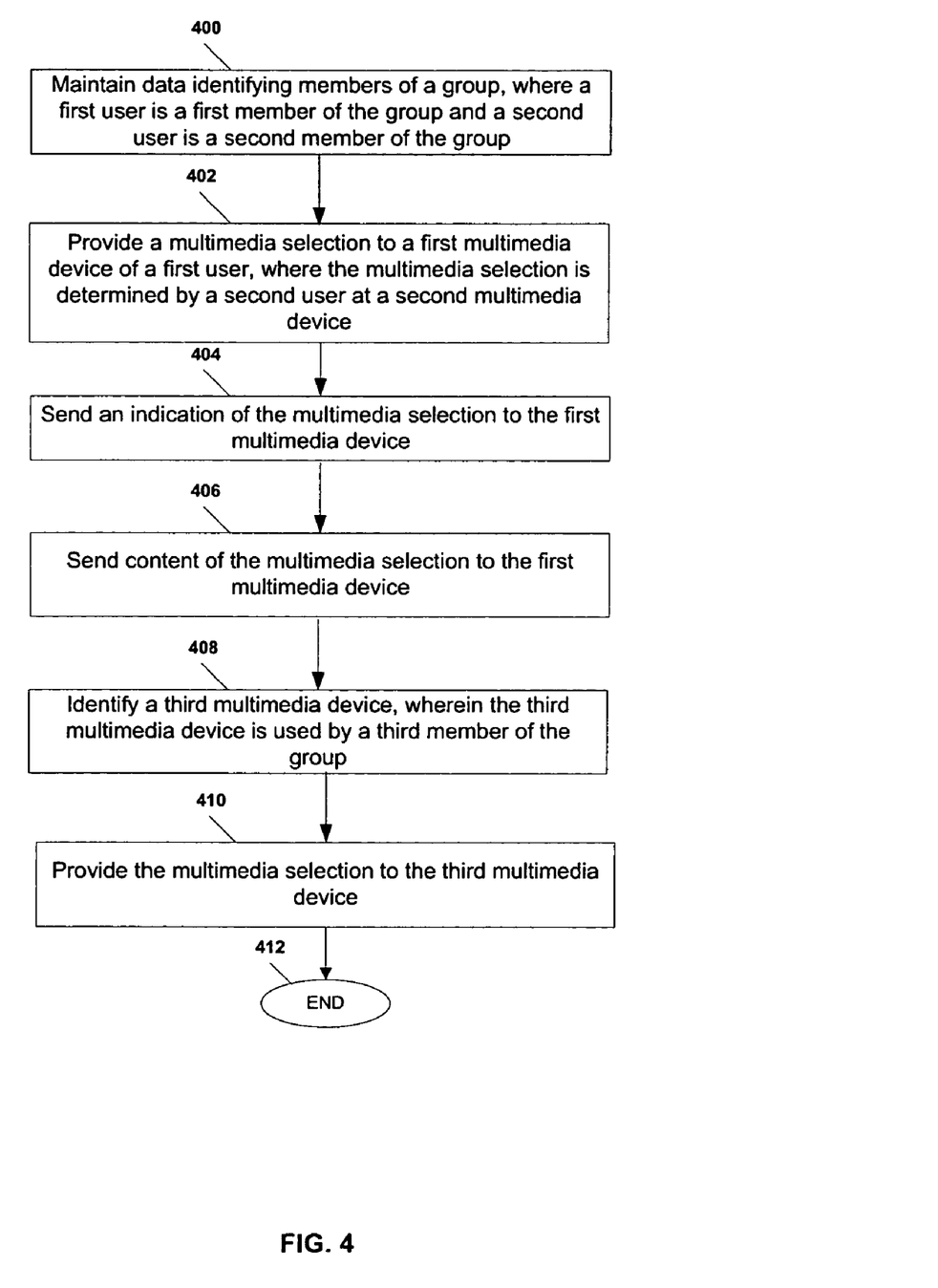
FIG. 4 is a flow diagram of a second particular illustrative embodiment of a method of distributing multimedia content.

Referring to FIG. 4, a flow diagram of a second particular illustrative embodiment of a method of distributing multimedia content is depicted. At block 400, in a particular embodiment, data identifying members of a group is maintained, where a first user is a first member of the group and a second user is a second member of the group. In a particular illustrative embodiment, the data is maintained by a presence group server, such as the presence and text messaging server 116 of the Internet Protocol television (IPTV) system 100 depicted in FIG. 1. The data can identify members of one or more groups and can contain authentication information for members to login, a list of members currently logged in, an indication of multimedia content selected at a receiver of each of the members, any other information necessary for group management, or any combination thereof.

Continuing to block 402, a multimedia selection is provided to a first multimedia device of the first user, where the multimedia selection is determined by the second user at a second multimedia device. In a particular embodiment, the first multimedia device communicates with a video distribution system, and the second multimedia device also communicates with the video distribution system. In a particular illustrative example, the video distribution system can be a cable television system. In another particular illustrative example, the video distribution system can be an IPTV system.

Proceeding to block 404, in a particular embodiment, an indication of the multimedia selection is sent to the first multimedia device. In a particular illustrative embodiment, a presence group server may receive a signal from the second multimedia device indicating a channel change by the second user. The presence group server may determine that the first user is logged in as a member of the same presence group as the second user. The presence group server may send an indication to the first multimedia device to indicate that the second user has selected the new channel. In another illustrative embodiment, the indication can provide data indicating a television program selected by the second user. In a particular illustrative embodiment, the indication may be sent as data in a menu tag inserted into a video stream received by the first multimedia device to display a selectable menu to the first user, such as by the user interface module 221 of the multimedia device 202 depicted in FIG. 2.

Moving to block 406, in a particular embodiment, content of the multimedia selection is sent to the first multimedia device. In an illustrative embodiment, the content of the multimedia selection can be sent to the first multimedia device by sending an instruction to the first multimedia device to tune to the television channel. In another illustrative embodiment, the content of the multimedia selection can be sent to the first multimedia device by sending an instruction to the first multimedia device to request the content from a multimedia content source, such as the channel content application server 114 or the channel burst application server 112 of the IPTV system 100 of FIG. 1. In another illustrative embodiment, the content of the multimedia selection can be sent to the first multimedia device via an instruction to an IPTV content source, such as the channel content application server 114 or the channel burst application server 112 of the IPTV system 100 of FIG. 1, to send the content to the first multimedia device. Thus, the content can be sent to the first multimedia device without the first multimedia device directly requesting the content from the content source.

Continuing to block 408, in a particular embodiment, a third multimedia device is identified, where the third multimedia device is used by a third member of the group. Proceeding to block 410, in a particular embodiment, the multimedia selection is provided to the third multimedia device. The method terminates at 412.

Figure 5:
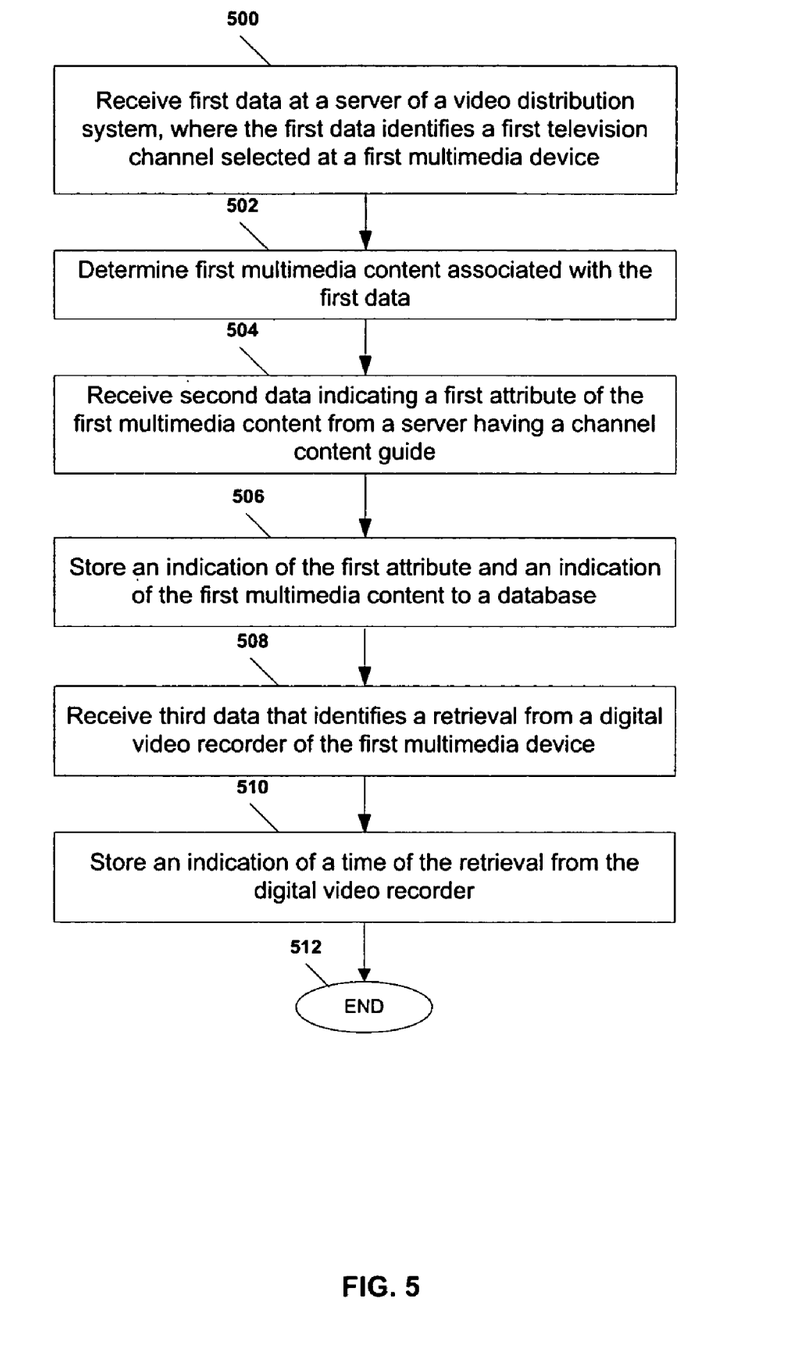
FIG. 5 is a flow diagram of a third particular illustrative embodiment of a method of distributing multimedia content.

Referring to FIG. 5, a third particular illustrative embodiment of a method of providing enhanced multimedia distribution is depicted. At block 500, first data is received at a server of a video distribution system where the first data identifies a first television channel selected at a first multimedia device. In an illustrative embodiment, the first data is received from the first multimedia device. For example, the first data can be sent to the server from a multimedia device in response to a data tag in the data stream received from the video distribution system. In another illustrative embodiment, the first data is received from a multimedia content source of the video distribution system but not from the first multimedia device. For example, in the IPTV system 100 depicted in FIG. 1, the first data may be received at the AMT server 106 from the channel burst application server 112, the channel content application server 114, or any combination thereof, indicating content sent to the STB 126.

Continuing to block 502, first multimedia content associated with the first data is determined. In a particular illustrative embodiment, the first data can identify the first multimedia device, the first channel, and a time or time range. The multimedia content associated with the first channel during the specified time may be determined by reference to channel content data stored at the server, by querying another server of the video distribution system having channel content data, or any combination thereof.

Moving to block 504, second data indicating a first attribute of the first multimedia content is received from a server having a channel content guide. In an illustrative embodiment, the first attribute can relate to a category such as a genre of the first multimedia content, such as "sports," "drama," "comedy," as illustrative, non-limiting examples. In accordance with another illustrative embodiment, the first attribute may relate to a characteristic of the first multimedia content other than a genre, such as, for example, whether the content is live or recorded, a premiere or syndicated, a rating provided by industry organization or by other subscribers, or any other characteristic, or any combination thereof. Proceeding to block 506, an indication of the first attribute and an indication of the first multimedia content are stored to a database.

Continuing to block 508, in a particular embodiment where the first data further identifies a recording to a digital video recorder (DVR) of the first multimedia device, third data is received that identifies a retrieval from the DVR. For example, although the first multimedia content may be selected at the first multimedia device, a user of the first multimedia device may choose to time-shift viewing the first multimedia content by storing it to a DVR to watch at a later time. When the content is retrieved from the DVR, such as when the user selects the content to view, the first multimedia device can send the third data to the server indicating that the recorded content has been retrieved from the DVR. In a particular illustrative embodiment, the content stored to the DVR can include a data tag instructing the first multimedia device to send the third data to the server. Moving to block 510, an indication of a time of the retrieval from the DVR is stored. The method terminates at block 512.

Referring to FIG. 6, a particular illustrative embodiment of a graphical user interface to provide enhanced multimedia distribution is depicted and designated 600. The interface 600 can include a first viewing region 604 to display first video content received at a first multimedia device, such as a set-top box 602, from a multimedia distribution system. In an illustrative embodiment, the multimedia distribution system can be an IPTV system such as the system 100 depicted in FIG. 1, and the interface 600 can be provided by the STB 126 to display at the display device 124.

The interface 600 can also include a second viewing region 620 to display second video content received from the multimedia distribution system, where the second video content is determined by a user of a second multimedia device coupled to the multimedia distribution system. In an illustrative embodiment, the multimedia distribution system is the IPTV system 100 as depicted in FIG. 1, and the user of the interface 600 is a member of a first presence group maintained by the presence and text messaging server 116. The second viewing region can depict content associated with a channel controlled by one or more members of the first presence group. The interface 600 can also include a first text messaging region 622 to enable text messaging between members of the first group. In a particular embodiment, the first text messaging region 622 can receive text input from the user of the interface 600, such as by a computer coupled to the set-top box 602, by a keyed input from a remote control device, by other methods of receiving text input, such as a speech recognition engine (not shown), or any combination thereof.

The interface 600 can also include an indication of a channel selected by a user of a third multimedia device coupled to the multimedia distribution system, such as indicators 607, 609, and 611. In a particular illustrative embodiment, identifiers 606, 608 and 610 identify members of a predetermined group of subscribers to the multimedia distribution system, and indicators 607, 609, and 611 each indicate a respective channel selected by the corresponding member of the predetermined group. Although the identifiers 606, 608, and 610 are depicted as names, the identifiers 606, 608, and 610 may include avatars, symbols, images, any other identifier, or any combination thereof. Furthermore, although the indicators 607, 609, and 611 are depicted as indicating a channel number, the indicators 607, 609, and 611 may include program names, descriptions, images, thumbnails, ratings, other identifying or descriptive information, or any combination thereof.

In a particular embodiment, the user interface 600 can have a third viewing region 630 to display third video content selected by a user of a fourth multimedia device. In an illustrative embodiment where the user of the interface 600 is also a member of a second presence group, the third viewing region 630 may display video content selected by other members of the second presence group. A second text messaging region 632 can enable text messaging between the user of the interface 600 and other members of the second group.

Figure 7:
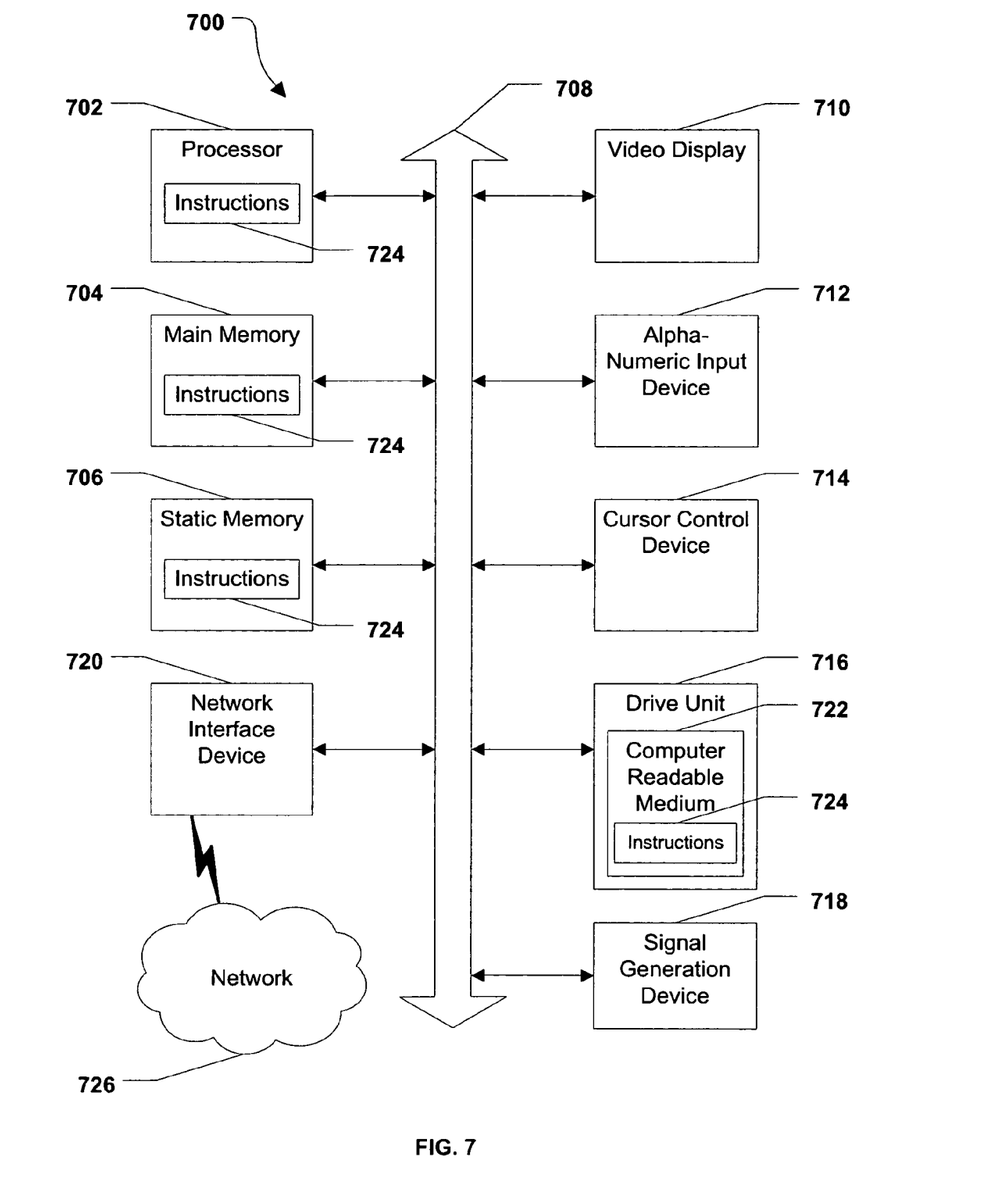
FIG. 7 is a diagram of an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a public network or a private network within an IPTV system, to other computer systems or peripheral devices, including a server or set-top box device, as illustrated in FIGS. 1 and 2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. Further, the computer system 700 can include a wireless input device 715, e.g., a remote control device. When the computer system 700, or any portion thereof, is embodied in a set-top box device, the cursor control device 714 can be a remote control device. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the systems and methods disclosed may display a multimedia selection at a display device coupled to a first receiver for a video distribution system, where the multimedia selection is determined by a user of a second receiver for the video distribution system. The systems and methods disclosed may provide a multimedia selection to a first multimedia device of a first user, where the multimedia selection is determined by a second user at a second multimedia device. An indication of multimedia content and an attribute of the content may be stored when data identifying a television channel selected at a first multimedia device is received at a server of a television system, content associated with the data is determined, and data indicating the attribute is received from a server having a channel content guide. A multimedia device may include a user identification module to identify a first user of the set-top box device and a user interface module to receive a command from a first user to accept a channel selection of a second user, where the channel selection is received via the network interface. A graphical user interface can include a first viewing region to display first video content and second viewing region to display second video content received at a first multimedia device, where the second video content is determined by a user of a second multimedia device. The interface can also include an indication of a channel selected by a user of a third multimedia device coupled to the multimedia distribution system.

Viewer history data can be obtained and stored at a database of a video distribution system, such as the AMT server 106 of the IPTV system 100 depicted in FIG. 1. The data can be provided or made available for marketing or statistical analysis, to enhance future multimedia content distribution. The analysis can be performed by a dedicated server of the television system, such as the marketing statistical analysis server 107 of the system 100, or can be performed by an outside service such as a independent marketing or datamining consultant. In addition, other pertinent data can be obtained and stored for analysis. For example, presence group membership and group content selection activity can provide useful marketing and statistical information. In addition, real-time replies to feedback prompts displayed to subscribers, such as by inserting menu tags in a video data stream, can provide subscriber opinions or other information of value of advertisers, content or program developers, or the like.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of distributing multimedia content, the method comprising:
   maintaining data identifying members of a first presence group, wherein a plurality of the members are participating members;
   receiving a first selection of multimedia content from a first multimedia device associated with a first member of the first presence group, wherein the first selection of multimedia content includes a first selected television channel;
   providing the first selection of multimedia content to the first multimedia device via a video distribution system to be displayed at a first region of a display device coupled to the first multimedia device;
   receiving a second selection of multimedia content from a second multimedia device associated with a second member of the first presence group, wherein the second selection of multimedia content includes a second selected television channel;
   automatically providing the second selection of multimedia content to the first multimedia device via the video distribution system to be displayed at a second region of the display device coupled to the first multimedia device, wherein the second region depicts the second selection of multimedia content associated with the second member of the first presence group;
   receiving a third selection of multimedia content from a third multimedia device associated with a first member of a second presence group, wherein the third selection of multimedia content includes a third selected television channel; and
   automatically providing the third selection of multimedia content to the first multimedia device via the video distribution system to be displayed at a third region of the display device coupled to the first multimedia device, wherein the third region depicts the third selection of multimedia content associated with the first member of the second presence group.

2. The method of claim 1, wherein each member of the first presence group can detect and interact with other members of the first presence group via the video distribution system.

3. The method of claim 1, wherein each member of the first presence group may elect to receive multimedia content selected by another member of the first presence group.

4. The method of claim 1, wherein the multimedia device of each member of the first presence group is a set top box.

5. The method of claim 1, wherein the video distribution system includes an Internet Protocol television system.

6. The method of claim 1, wherein the signal initiates display of a selectable menu at the first multimedia device of the first member of the first presence group, wherein the selectable menu includes notification of the third selected television channel, includes a first option to accept a channel change to the third selected television channel, and includes a second option to reject the channel change.

7. The method of claim 1, further comprising:
   receiving a request from the third multimedia device associated with the first member of the second presence group to change the third selection of multimedia content to a fourth selection of multimedia content, wherein the fourth selection of multimedia content includes a fourth selected television channel; and
   automatically providing the fourth selection of multimedia content to the first multimedia device via the video distribution system to be displayed at the third region of the display device coupled to the first multimedia device.

8. A computer-readable non-transitory storage medium embodying executable instructions, the executable instructions comprising:
   instructions to maintain data identifying members of a first presence group, wherein a plurality of the members are participating members;
   instructions to receive a first selection of multimedia content from a first multimedia device associated with a first member of the first presence group, wherein the first selection of multimedia content includes a first selected television channel;
   instructions to provide the first multimedia content to the first multimedia device via a video distribution system to be displayed at a first region of a display device coupled to the first multimedia device;
   instructions to receive a second selection of multimedia content from a second multimedia device associated with a second member of the first presence group, wherein the second selection of multimedia content includes a second selected television channel;
   instructions to automatically provide the second selection of multimedia content to the first multimedia device via the video distribution system to be displayed at a second region of the display device coupled to the first multimedia device, wherein the second region depicts the second selection of multimedia content associated with the second member of the first presence group;
   instructions to receive a third selection of multimedia content from a third multimedia device associated with a first member of a second presence group, wherein the third selection of multimedia content includes a third selected television channel; and
   instructions to automatically provide the third selection of multimedia content to the first multimedia device via the video distribution system to be displayed at a third region of the display device coupled to the first multimedia device, wherein the third region depicts the third selection of multimedia content associated with the first member of the second presence group.

9. The computer-readable non-transitory storage medium of claim 8, wherein the video distribution system includes an Internet Protocol television system, and wherein the multimedia receiver of each member of the first presence group is a set top box.

10. The computer-readable non-transitory storage medium of claim 8, wherein each member of the first presence group can detect and interact with other members of the first presence group via the video distribution system, and wherein each member of the first presence group may elect to receive multimedia content selected by another member of the first presence group.

* * * * *